US007007916B2

(12) United States Patent
Lee

(10) Patent No.: US 7,007,916 B2
(45) Date of Patent: Mar. 7, 2006

(54) LOW FLOW VALVE IMPROVEMENT

(75) Inventor: Hyok Lee, Corona, CA (US)

(73) Assignee: The Toro Company, Bloomington, MN (US)

( * ) Notice: Subject to any disclaimer, the term of this patent is extended or adjusted under 35 U.S.C. 154(b) by 55 days.

(21) Appl. No.: 10/789,862

(22) Filed: Feb. 27, 2004

(65) Prior Publication Data

US 2005/0189506 A1 Sep. 1, 2005

(51) Int. Cl.
*B08B 1/00* (2006.01)
(52) U.S. Cl. .................. 251/30.02; 251/331; 251/61
(58) Field of Classification Search ........... 251/30.01, 251/30.02, 61, 61.2, 331
See application file for complete search history.

(56) References Cited

U.S. PATENT DOCUMENTS

| 3,336,843 | A | * | 8/1967 | Griswold ............... 92/100 |
| 4,081,171 | A | * | 3/1978 | Morgan et al. ......... 251/30.02 |
| 4,135,696 | A | * | 1/1979 | Saarem et al. ......... 251/30.02 |
| 4,180,236 | A | * | 12/1979 | Saarem et al. ......... 251/30.02 |
| 5,996,608 | A | * | 12/1999 | Hunter et al. ........... 137/244 |
| 6,394,413 | B1 | * | 5/2002 | Lohde et al. .......... 251/129.03 |

* cited by examiner

*Primary Examiner*—J. Casimer Jacyna
(74) *Attorney, Agent, or Firm*—Inskeep IP Group, Inc.

(57) ABSTRACT

The present invention illustrates an irrigation valve that operates at low flows by providing a guide washer of the valve assembly that prevents diaphragm extrusion. Specifically, the circular channel area of a guide washer of the valve includes spoke-like fins. These fins keep the diaphragm from extruding into the open channel over time, while allowing for easy guide washer manufacturing.

10 Claims, 4 Drawing Sheets

LOW FLOW VALVE IMPROVEMENT

FIELD OF THE INVENTION

This invention relates to an irrigation valve for controlling the flow of water through piping of an irrigation system. More particularly, this invention relates to an irrigation valve with improved operation at low water flows.

BACKGROUND OF THE INVENTION

Flow control valves are a well known and integral part of most irrigation systems. A typical example can be seen in U.S. Pat. No. 6,394,413 to Lohde, et al, herein incorporated by reference.

These valves control the flow of water through an upstream pipe and thereby turn sprinklers fed by the pipe on and off. Such valves are usually remotely actuated by control signals sent from an automated irrigation controller. Often, these control signals are electric impulses sent from the controller to a solenoid in the valve which ultimately controls whether the valve is open or closed.

Pilot-activated diaphragm-operated valves for use in irrigation systems are well known. One example can be seen in U.S. Pat. No. 3,336,843, herein incorporated by reference.

This style of valve has a closure member with a sealing surface which moves against or away from an annular seat to close or open the valve, respectively. Integral to the closure member is a diaphragm positioned to seal off an upper portion of the valve. When the valve is to be opened, the fluid pressure is relieved by bleeding fluid out of the diaphragm chamber through a manual valve or a remotely operated solenoid valve. Relieving this pressure allows the closure member to move upwards as water passes through the valve.

To save on manufacturing expenses and also to avoid the negative effects of material warpage and deformation, the closure member must be molded in such a way that it has a constant wall thickness, resulting in open channels or spaces, commonly called "material savers." What has been discovered, however, is that over time, the diaphragm may extrude into these channels or spaces. This extrusion increases tension on the diaphragm, preventing valve closure at low water flows.

Some prior art valves available on the market today prevent the diaphragm extrusion into the closure member by providing a separate plastic insert into the inner channel of the guide washer. While this method prevents diaphragm extrusion, it presents increased manufacturing expense and difficulties by presenting another plastic part to design and injection mold. Further, the manufacturing conditions for both the closure member and the insert must be highly controlled and precise, otherwise the insert will fit poorly within the closure member, risking inefficient or faulty valve operation.

Therefore, what is needed is a single piece closure member that is easily manufactured, yet also prevents diaphragm extrusion within the closure member.

OBJECTS AND SUMMARY OF THE INVENTION

It is an object of the present invention to provide an improved valve that closes properly under low flow water conditions.

It is a further object of the present invention to provide an improved valve that continues to close at low water flows over an extended period of time.

The present invention seeks to address the above described problems and others not specifically enumerated here by providing a valve having an improved closure member, the preferred embodiment of which are described below.

DETAILED DESCRIPTION OF THE INVENTION

Figure 1:
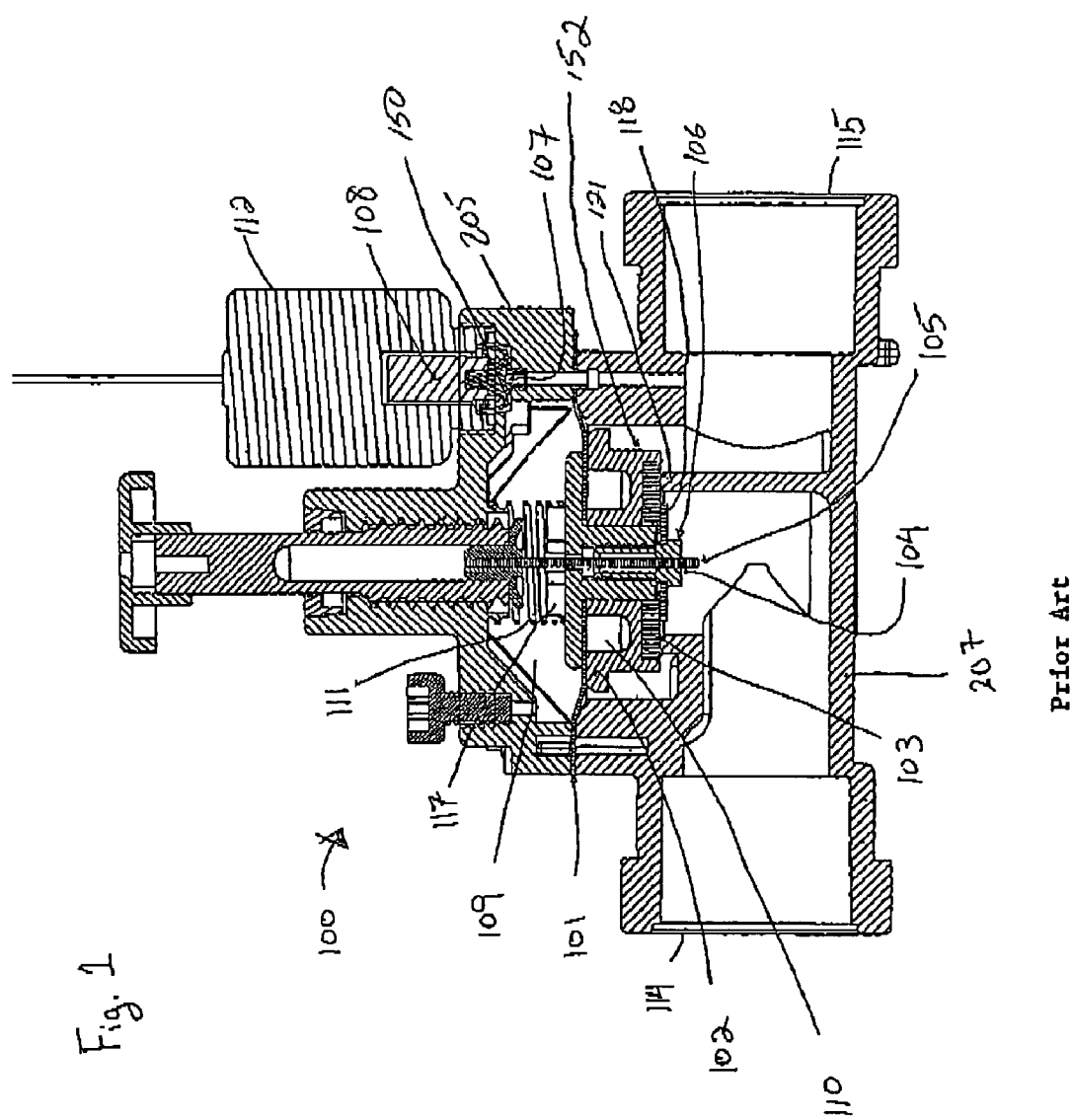
FIG. 1 is a cross sectional view of an irrigation valve of the prior art.
Figure 2:
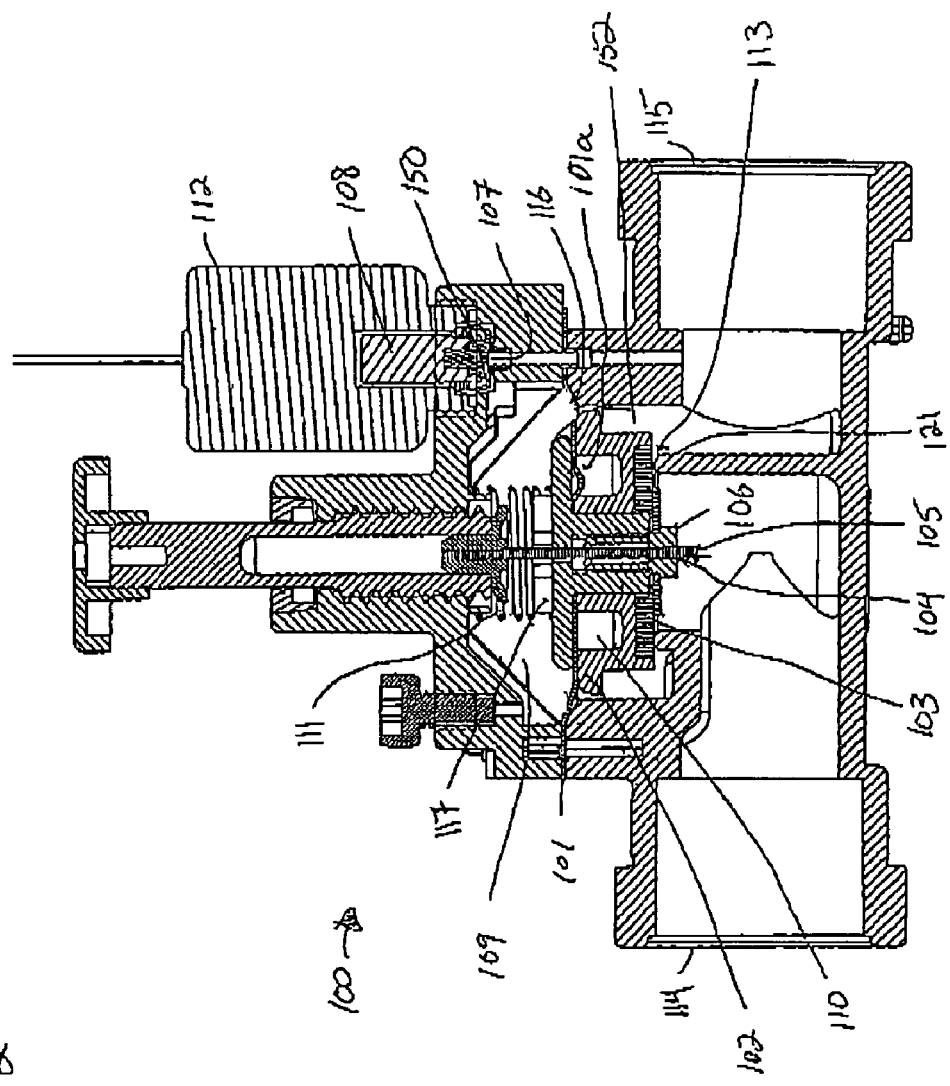
FIG. 2 is a cross sectional view of an irrigation valve as shown in FIG. 1 with a diaphragm extruded into a closure member.

FIGS. 1 and 2 illustrate a prior art irrigation valve 100 in the closed position. This irrigation valve 100 includes a water inlet port 114, a water outlet port 115, and a guide washer 102 that includes a sealing surface 103. Typically the sealing surface 103 is made from a rubber or other resilient material.

The valve is actuated by a solenoid 112 that is connected to a solenoid plunger 108 which controls the opening and closing of a discharge port 107. In the closed position, the solenoid plunger 108 blocks a passage 150 that otherwise connects a diaphragm chamber 109 (located above a diaphragm 101) to the discharge port 107 and to the valve water outlet port 115.

Figure 5:
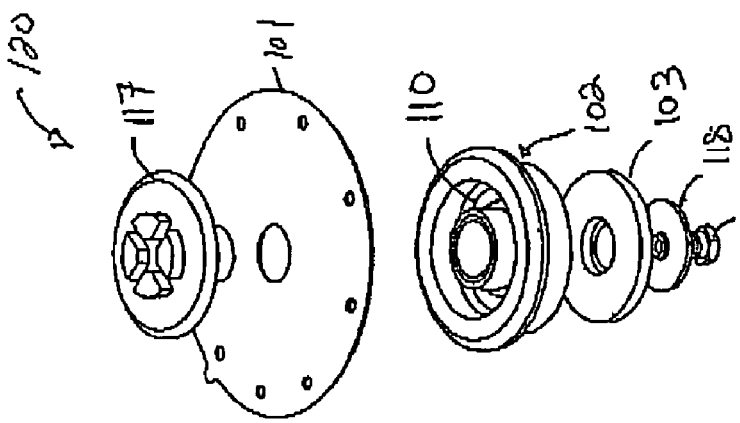
FIG. 5 is a plan view of a typical valve diaphragm assembly of the prior art.
Figure 4:
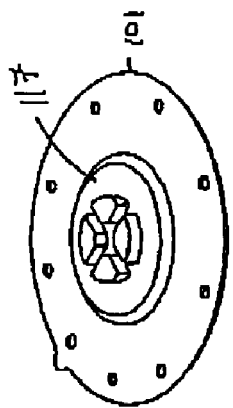
FIG. 4 is a plan view of a valve diaphragm of the prior art.

The valve assembly 120 seals off the diaphragm chamber 109 from the lower portion of the valve. As seen in FIG. 5, the valve assembly 120 is made up of a diaphragm retaining cap 117 which sits over a diaphragm 101. Beneath the diaphragm sits a guide washer 102 having an inner circular channel 110. Retained in the guide washer 102 is a sealing surface 103. The sealing surface 103 is secured to the guide washer 102 with a valve washer 118 and metering insert 106.

The diaphragm 101 is typically composed of a semi elastic material such as rubber. Such elastic material allows the diaphragm to flex as the valve assembly 120 rises up to an open position and down to a closed position. The diaphragm is secured in the valve 100 between the upper portion 205 of the valve 100 and the lower portion 207 of the valve 100. These two halves are secured together with screws (not shown). As seen in FIGS. 1 and 2, a properly secured diaphragm creates the upper diaphragm chamber 109.

As best seen in FIGS. 1 and 2, metering pin 105 is located within the center of valve assembly 120. The clearance 104 between the metering insert 106 and metering pin 105 allows water to enter into the diaphragm chamber 109. The diameter of the metering pin 105 may be changed to let varying amounts of water into the diaphragm chamber 109, thus controlling the pressure within the diaphragm chamber 104.

In the closed position, the water pressure in the diaphragm chamber 109 is equal to the water pressure in the valve through water inlet port 114. In contrast, the water pressure of diaphragm chamber 109 is much less than the pressure of water entering through the water inlet port 114 when the valve is set to the open position as discussed below. The pressure is lower due to the pressure drop that occurs when the water flows through the clearance 104.

In operation, a water supply is connected to water inlet port 114, and further portions of an irrigation system are connected to water outlet port 115. When the solenoid 112 is un-energized, the solenoid plunger 108 is biased to cover and seal the discharge port 107. As water enters from the water inlet port 114, it travels through the clearance 104 of the metering insert 106, into the diaphragm chamber 109. Simultaneously, due to losses resulting from flow of water, the pressure of the inlet port 114 drops while passing between the seal surface 103 and valve seat 121, causing an annular area of low pressure 152, which helps the diaphragm assembly 120 to move downwards. Pressure builds within the diaphragm chamber 109 until it approaches equalization with the water pressure coming in from water inlet port 114. Typical inlet pressure is about 60 psi. With the help of the spring 111, the diaphragm assembly continues downwards until the sealing surface 103 makes contact with the valve seat 121.

In the shut position, the pressure within the diaphragm chamber 109 is equal to the pressure of the inlet 114, but the overall force on the diaphragm assembly 120 is downwards. This is due to the fact that the pressure in the diaphragm chamber 109 is exerting its effect over a larger surface area of the diaphragm assembly 120, than the pressure in the inlet 114. This downward resultant force prevents the diaphragm assembly 120 from being pushed up from the water pressure of the inlet 114. As a result, the sealing surface 103 of the diaphragm assembly 120 remains seated on the valve seat 121, preventing passage of the inlet water through the valve.

When the solenoid 112 is energized, the solenoid plunger 108 lifts and thus allows water from the diaphragm chamber 109 to pass through the discharge port 107 and out to the water outlet port 115. The open discharge port 107 thus causes pressure in the diaphragm chamber 109 to drop. As a result, the water from the water inlet port 114 pushes up on the valve assembly 120, which compresses valve spring 111 and unseats the sealing surface 103 from the valve seat 121. With the valve pushed upwards, away from its valve seat 121, water may freely pass from the water inlet port 114, through valve 100, and out water outlet port 115.

FIG. 2 illustrates a problem common to prior art irrigation valves. To improve manufacturability and reduce costs, guide washer 102 is formed with an inner circular channel 110. This inner circular channel 110 is covered by diaphragm 101. Due to factory manufacturing conditions, air is often trapped between the diaphragm 101 and this inner circular channel 110.

When the valve 100 is in the closed position, pressure builds in the diaphragm chamber 109. Since air compresses under pressure, unlike water, a portion of the diaphragm 101a is thus pushed or extruded into the circular channel 110. Consequently, the peripheral edges of the diaphragm 101 become stretched and taut, making it more difficult for the valve to close.

When flow into the valve 100 is medium to high (typically about 5–30 gallons per minute), the additional closing force generated by the low pressure region in the annular space 152 required to seat the valve seal 103 is available, in spite of the extruded diaphragm, and the valve assembly 120 properly closes. But when flow into the valve 100 is low (typically less than about 5 gallons per minute), the resulting low pressure region generated in the annular space 152 is insufficiently low enough to fully seat the sealing surface 103 onto the valve seat 121.

In some circumstances, the faulty valve assembly 120 remains open about 0.02–0.05 inches, which is enough for the valve 100 to flow 1–4 gallons per minute, never fully shutting off. And, over time, the diaphragm 101 becomes increasingly stretched, as greater portions 101a of the diaphragm 101 extrude into the circular channel 110.

The present invention seeks to avoid the above problem by presenting a guide washer 201 which prevents extrusion of the diaphragm 101 into the circular channel 110.

Figure 6:
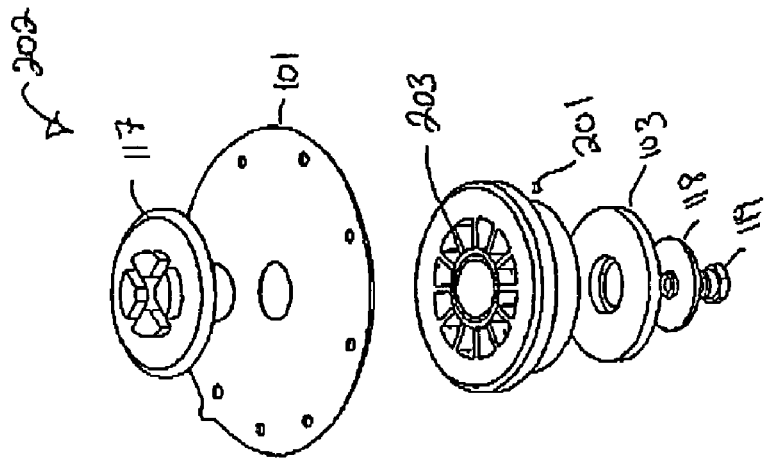
FIG. 6 is a plan view of one embodiment of the present invention.

FIG. 6 illustrates one embodiment of a valve assembly 202 containing a spoked guide washer 201. The spoked guide washer 201 is circular in shape, having an inner circular channel interrupted by multiple fins 203. Each fin 203 extends to the bottom of the inner channel and is level with the surface of the spoked guide washer 201.

The positioning and the numbering of fins 203 are such that they prevent the diaphragm 101 from extruding into the gaps of the inner channel of the spoked guide washer 201. Although air may be present in gaps of the inner channel, the spokes maintain the relative position of the diaphragm 101 and thus better ensure the valve functionality (e.g. closure) at low water flows.

Figure 3:
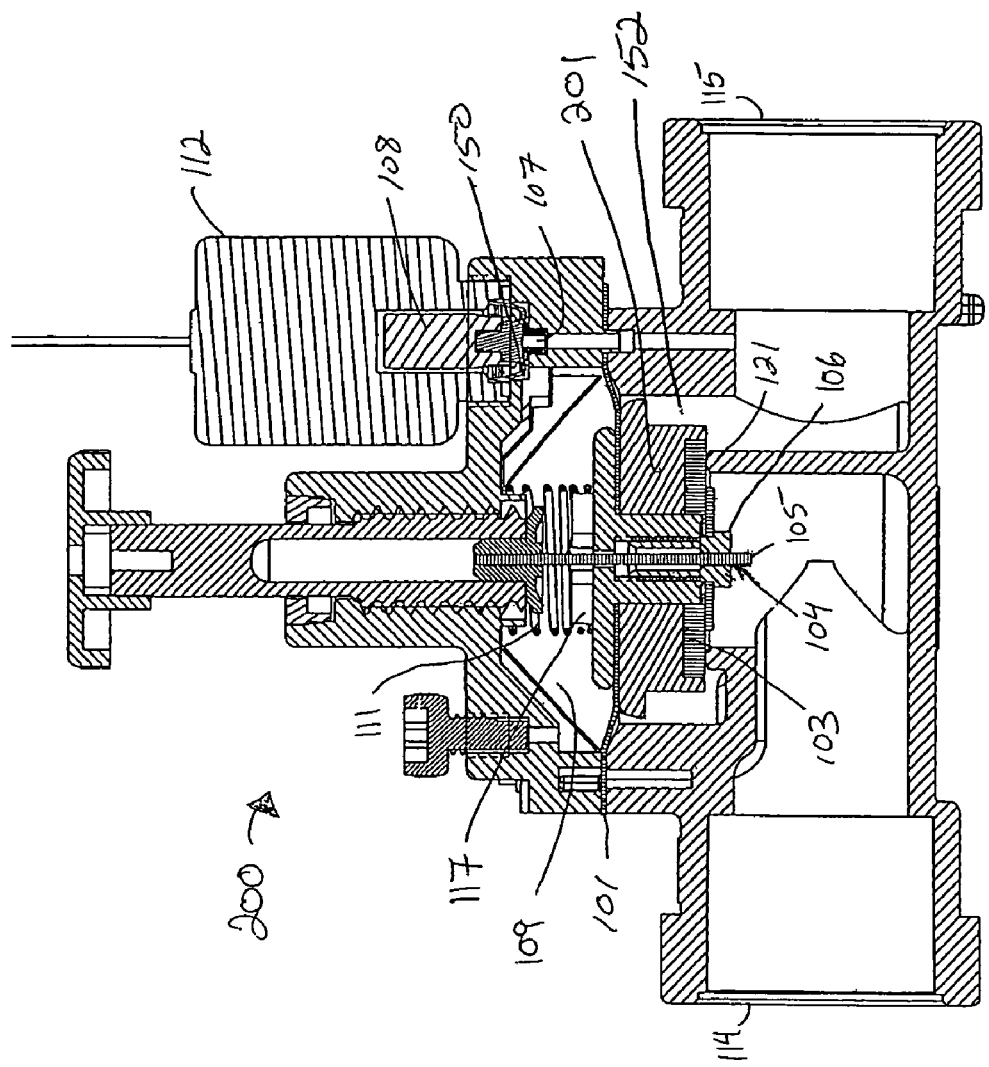
FIG. 3 is a cross sectional view of one embodiment of the present invention.

FIG. 3 illustrates the spoked guide washer's 201 positioning within the improved valve 200. With higher reliability, the improved valve 200 may be used for a wider variety of irrigation uses, such as drip irrigation.

It is known in the art that an injection molding process is best used when the design of the molded part ensures that even cooling of the molten plastic occurs. If cooling differentials occur, then the molded plastic article will likely encounter sink problems that distort or warp the molded article shape from it's intended original form.

The design of spoked guide washer 201 allows the article to cool evenly by virtue of the spaces between fins 203, thus ensuring that the guide washer 201 maintains its original intended shape.

In a preferred embodiment, the present invention prevents diaphragm extrusion with a spoked guide washer 201, keeping design and manufacturing costs low, while also reducing possible complication associated with additional parts.

An alternative embodiment of the present invention (not pictured) includes spoked bars within the guide washer wherein the bars are, radially positioned and flush with the upper surface. Like the previous embodiment's fins, the bars help support the diaphragm while preventing extrusion into the inner channel of the guide washer. Unlike the fins, the bars do not extend downward to the bottom of the inner channel, yet still provide the same extrusion resistant benefits.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An irrigation valve comprising:
   a valve housing having an interior valve seat;
   a valve sized to mate with said valve seat;
   a guide washer positioned above said valve and having an inner circular channel containing fins;

a diaphragm separating said valve into an upper diaphragm chamber and a lower main water flow chamber; said diaphragm positioned adjacent to said guide washer over said fins; and a solenoid disposed on said valve housing and configured to create and relieve water pressure within said diaphragm chamber and thereby control water flow through said main water flow chamber.

2. The irrigation valve of claim 1 wherein said guide washer is comprised of plastic.

3. The irrigation valve of claim 1 wherein said fins extend radially across said circular channel.

4. The irrigation valve of claim 1 wherein said fins extend axially to a bottom surface of said circular channel.

5. An irrigation valve comprising:

a housing separated into an upper chamber and a lower chamber;

a diaphragm interposed between said upper and lower chamber;

a sealing member disposed in said lower chamber to control fluid flow within said lower chamber;

said sealing member having an upper surface positioned to contact said diaphragm;

said upper surface comprising a slotted annular space so as to provide support to said diaphragm during substantially all pressure conditions in said upper chamber.

6. An irrigation valve according to claim 5 wherein said slotted annular space is an annular space with radially extending fins.

7. An irrigation valve according to claim 5 wherein said slotted annular space is an annular space with radially extending bars.

8. An irrigation valve according to claim 6 wherein said fins extending axially to a bottom surface of said slotted annular space.

9. A method of operating an irrigation valve comprising:

providing a valve by which flow through said valve is controlled by pressurization and depressurization of a diaphragm chamber;

preventing undue tension on a diaphragm of said diaphragm chamber by providing substantially uniform support of said diaphragm during all occurrences of pressurization of said diaphragm chamber, including supporting said diaphragm with a non-continuous surface.

10. A method according to claim 9 wherein providing substantially uniform support includes supporting said diaphragm with a slotted annular surface.

* * * * *